United States Patent [19]
Matter

[11] Patent Number: 5,590,341
[45] Date of Patent: Dec. 31, 1996

[54] METHOD AND APPARATUS FOR REDUCING POWER CONSUMPTION IN A COMPUTER SYSTEM USING READY DELAY

[75] Inventor: Eugene P. Matter, Folsom, Calif.

[73] Assignee: Intel Corporation, Santa Clara, Calif.

[21] Appl. No.: 316,547

[22] Filed: Sep. 30, 1994

[51] Int. Cl.$^6$ .................................................. G06F 1/04
[52] U.S. Cl. .................................. 395/750; 395/287
[58] Field of Search .................... 395/750, 726, 395/287, 550

[56] References Cited

U.S. PATENT DOCUMENTS

| | | | |
|---|---|---|---|
| 4,758,945 | 7/1988 | Remedi | 395/750 |
| 4,851,987 | 7/1989 | Day | 395/550 |

*Primary Examiner*—Jack B. Harvey
*Assistant Examiner*—Jeffrey K. Seto
*Attorney, Agent, or Firm*—Blakely, Sokoloff, Taylor & Zafman

[57] ABSTRACT

A computer system that contains devices and peripherals that have power management capabilities incorporated therein that are responsible for placing the computer system in a reduced power consumption state. A controller monitors bus cycles from a processor. Upon the completion of each bus cycle, the controller provides a completion indication to the processor. In the present invention, the controller withholds the completion indication for a period of time after completion of each of the selected bus cycles to control power consumption by the processor, thereby extending the time in which the processor is in the reduced power consumption state. In this way, power consumption in the processor is controlled within an instruction boundary.

21 Claims, 2 Drawing Sheets

METHOD AND APPARATUS FOR REDUCING POWER CONSUMPTION IN A COMPUTER SYSTEM USING READY DELAY

FIELD OF THE INVENTION

The present invention relates to the field of computers and computer systems; more particularly, the present invention relates to reducing power consumption in a computer system by delaying the assertion (or nonassertion) of a ready signal during certain system bus cycles.

BACKGROUND OF THE INVENTION

Typically, a computer system contains a processor, a bus, and other peripheral devices. The processor is responsible for executing instructions using data in the computer system. The bus is used by the processor and the peripheral devices for transferring information between one another. The information on the bus usually includes data, address and control signals. The peripheral devices comprise storage devices, input/output (I/O) devices, etc. Generally, all operations being performed in the computer system occur at the same frequency.

Many computer systems today employ a READY signal to terminate transfers on the bus. In such systems, the READY signal is an input to the processor and signifies to the processor whether the bus is available for another transfer. If a transfer is occurring on the bus or another peripheral device has control of the bus, the READY signal is not asserted until the transfer is complete. Once the transfer has been completed, the READY signal is asserted so that the processor knows that the bus is available. Typically system logic is responsible for controlling the state of the READY signal.

Reducing power consumption is an important concern with many modern personal computers. The reduction of power consumption is particularly significant with respect to battery-powered laptop or notebook style personal computers. By reducing power consumption, the battery life can be extended. These computer systems are often equipped with power management capabilities to reduce power consumption. These power management capabilities usually include the ability to reduce power consumption when a portion of the computer system is not being used or has not been used for some specific period of time.

Power management capabilities are also integrated into the integrated circuit devices themselves. Such devices include capabilities to monitor their activity, and may include monitoring their pins. If the device reaches a predefined set of inactivity, the device is able to place itself in a reduced power consumption state. When conditions or signals change, they are able to return to full power. Power use may be reduced in the portion of the device by turning off that portion of circuitry, by disabling power to the circuitry, or preventing that circuitry from receiving its regular clocking. The powered-down portion may be returned to full activity in response by enabling its power and/or clock. Although these devices and peripherals are equipped with power management capabilities, the operation of the power management capabilities is usually in response to a defined set of criteria. That is, only when the predefined criteria have been met, the power management capabilities are employed.

Sometimes, additional power savings is needed. For instance, if the voltage level of the battery supplying power to the computer system becomes low, additional power savings may be required to extend its battery life. Also, there may be a need to provide thermal management to the computer system where the temperature of the computer system is approaching or exceeding a maximum operating range. In such a case, it may be necessary to reduce power consumption to reduce the temperature of the computer system. If the computer system employs devices and peripherals with their own power management capability, these devices may not be able to provide the additional power management needs if their predefined criteria has not been met. The system designer could provide hardware in the computer system which is able to supply additional power management support. However, the requirement of additional devices or peripheral in the computer system typically results in higher costs. Therefore, it may be desirable to utilize the already existing power management capabilities of the devices in the computer system to achieve additional power savings for the computer system.

The present invention provides for reducing power consumption in a computer system. The computer system of the present invention incorporates devices that include power management capabilities. The present invention controls these devices to manipulate their power management capabilities. By doing so, the present invention is able to provide additional power savings beyond that normally designed for the device itself.

SUMMARY OF THE INVENTION

A computer system is described that contains devices and peripherals that have power management capabilities incorporated therein responsible for placing themselves, and thus, the computer system, into and out of a reduced power consumption state. The computer system of the present invention contains a bus that provides a communication pathway for use by other units and devices in the computer system, a memory that stores data and instructions, and an integrated circuit (e.g., a processor) for performing a designated function (e.g., executing instructions). The integrated circuit is responsive to an input signal (e.g., a READY signal) indicating whether a bus cycle is or is not being performed.

In one embodiment, a processor of the present invention has power management capabilities incorporated therein that enable it to enter a reduced power consumption state when performing selected bus cycles (e.g., I/O bus cycles, memory reads, etc.). One power management mechanism is included on-chip to monitor when selected cycles are being performed. Upon determining one of the selected bus cycles is being performed, the processor reduces power consumption. The processor exits the reduced power consumption state after the bus cycle completes. The processor is notified of the completion of a bus cycle by receipt of one or more signals issued from within the computer system.

The computer system of the present invention also includes a controller that monitors bus cycles. Upon the completion of each bus cycle, the controller provides a completion indication (e.g., asserts a READY signal) to the processor. In the present invention, the controller withholds the completion indication for a period of time after completion of each of the selected bus cycles to control power consumption by the processor, thereby extending the time in which the processor is in the reduced power consumption state. Because the processor is placed in a reduced power consumption state during execution of an instruction, power consumption in the processor is controlled within an instruction boundary.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

Figure 1:
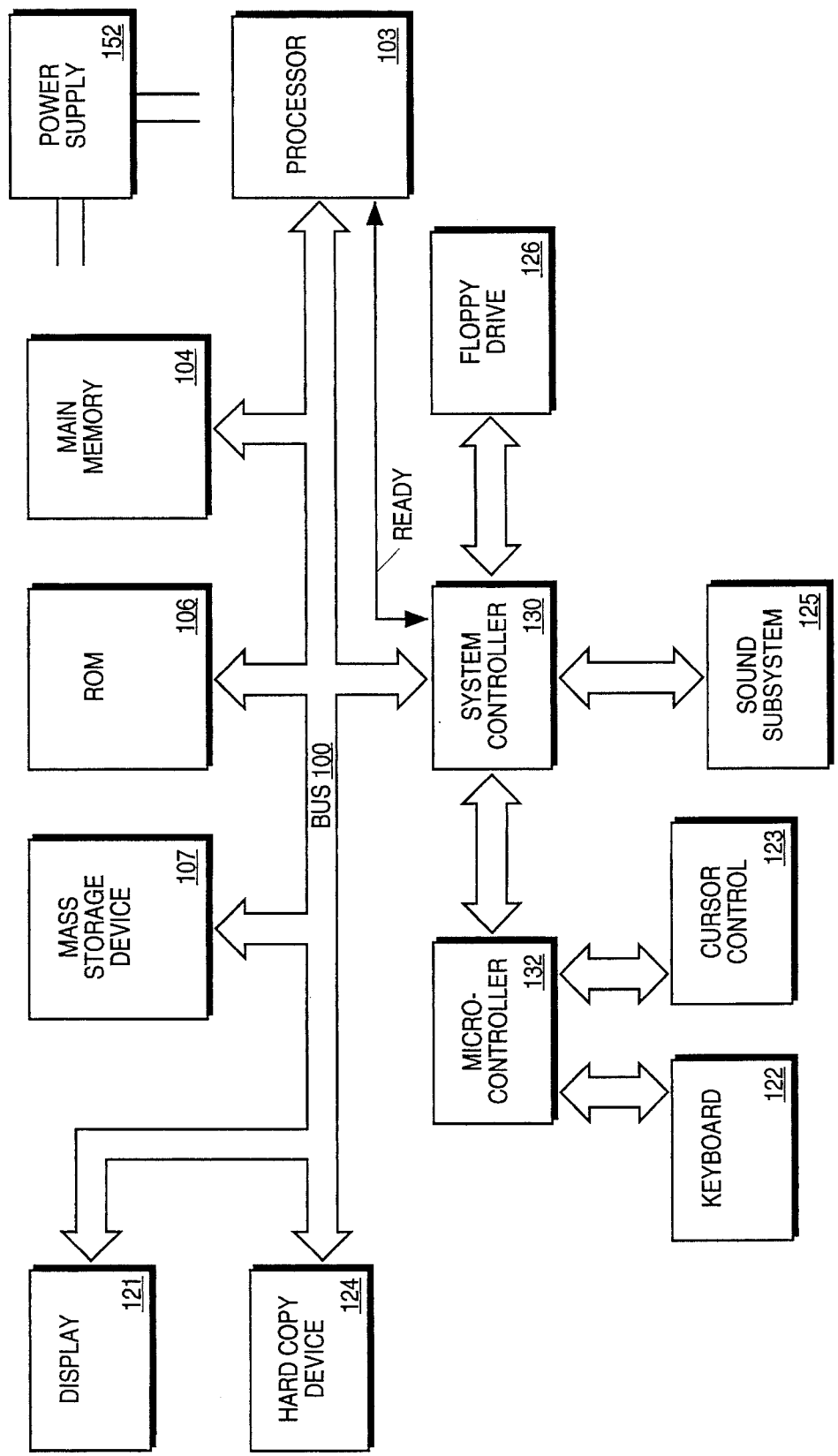
FIG. 1 is a block diagram of one embodiment of the computer system of the present invention.

A method and apparatus for reducing power consumption in a computer system is described. In the following detailed description of the present invention, numerous specific details are set forth, such as specific signals, names, bus cycle names, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Overview of the Present Invention

The present invention uses standard bus signals in conjunction with existing power management capabilities in specific integrated circuits in a computer system (e.g., processor) in order to provide additional power savings in the computer system. This further reduced power consumption is accomplished without adding excessive latencies.

In the present invention, at least one integrated circuit (IC) in the computer system, such as a processor, is a bus master and places itself in a reduced power consumption state when performing selected bus cycles. Therefore, while one of the selected bus cycles is occurring on the system bus, the IC enters and remains in a reduced power consumption state. When the bus cycle completes, the IC exits the reduced power consumption state and enters a state of increased power consumption (e.g., back to the full power consumption state) to continue performing its designated function.

The completion of a bus cycle is indicated to the IC using one or more signals. When the specified signal(s) is set in a particular state, the IC knows that the bus cycle has ended (e.g., terminated). In one embodiment of the present invention, the ready (e.g., RDY#) or burst ready (e.g., BRDY#) signals are used to indicate that bus cycles have ended. Note that the "#" symbol indicates that the signal is active low. During a bus cycle, the ready (or burst ready) signal is deasserted. After the bus cycle has completed, the ready signal is asserted, thereby indicating to the IC that the bus cycle has completed.

In the present invention, a processor in the computer system is responsive to the ready signals (e.g., RDY#, BRDY#). The ready signals are not asserted during external I/O and memory cycles. When either or both of the ready signals are not asserted, the on-board power management capabilities of the processor cause clock transitions within the processor to be reduced, thereby causing a reduction in power consumption. In one embodiment of the processor, the clock transitions in the processor are halted (e.g., totally reduced). Thus, during external I/O and memory cycles, the processor of the present invention is maintained in a reduced power consumption state because the normal clock transitions have been reduced.

In the present invention, during selected external I/O and memory cycles, the assertion of the ready signal(s) is delayed, thereby extending the length of time that the processor is in the reduced power consumption state. In this manner, additional power savings occurs.

System logic generates the ready signals and coordinates the activities on the bus. The system logic is designed in a manner well-known in the art to identify bus cycles and return the ready signals after bus cycles have completed. In the present invention, the system logic is also designed to provide a delay after completion of selected bus cycles to prevent the ready signal(s) from being asserted immediately after the completion of selected I/O and memory cycles. This delay causes the IC (e.g., processor) to remain in a reduced power consumption state longer than if the bus cycle termination signal had been asserted at the completion of the bus cycle.

Using circuit and control logic of the ready signals for the I/O and memory read cycles, the present invention allows system designers to reduce active power consumption for a computer system by determining how long to hold the processor bus cycle termination signal (e.g., RDY#, BRDY#) after a bus cycle has completed to achieve a desired power consumption savings.

Thus, by combining the built-in power management capabilities of the processor or other integrated circuit with control of the bus cycle completion signal, the present invention provides additional power savings.

The Computer System of the Present Invention

Referring to FIG. 1, an overview of the computer system of the present invention is shown in block diagram form. The present invention may be implemented on a general purpose microcomputer, such as one of the members of the IBM personal computer family, one of the Apple family of computers or one of the several other computer system devices which are present commercially available. Of course, the present invention may also be implemented on a multi-user system while encountering all of the costs, speed and function advantages and disadvantages available with these machines.

As illustrated in FIG. 1, the computer system of the present invention generally comprises a bus or other communication means 100 for communicating information, a processor 103 coupled with bus 100 for processing information, a random access memory (RAM) or other dynamic storage device 104 (commonly referred to as main memory) coupled with bus 100 for storing information and instructions for processor 103, and a read-only memory (ROM) or other non-volatile storage device 106 coupled with the bus 100 for storing non-volatile information and instructions for processor 103.

A mass storage device 107, such as a magnetic tape and disk drive, including its associated controller circuitry, is coupled to bus 100 for storing information and instructions. A display device 121, such as a cathode ray tube, liquid crystal display, etc., including its associated controller circuitry, is coupled to bus 100 for displaying information to the computer user. A hard copy device 124, such as a plotter or printer, including its associated controller circuitry, may be included for providing a visual representation of the computer images and data to the user.

A system controller 130 is coupled to bus 100 and controls access to certain input/output (I/O) peripherals in the computer system. For instance, controller 130 is coupled to a microcontroller 132 that controls access to an output-numeric input device 122 including alpha-numeric and other keys, etc., for communicating information and command selections to processor 103, and a cursor control device 123, such as a trackball, stylus, mouse, or trackpad, etc., for controlling cursor movement.

The computer system also includes a sound subsystem 125 coupled to controller 130 for generating various audio signals from the computer system. Controller 130 may also provide access to a floppy disk and driver 126. The processor 103 controls controller 130 and its associated peripherals by sending commands to the controller 130 using bus 100.

Batteries or other power supply 152 may also be included to provide power necessary to run the various peripherals and integrated circuits and devices in the computer system. The power supply 152 is typically a DC power source that provides a constant DC power to various units particularly processor 103. Various units such as processor 103, display 121, etc., also receive clocking signals to synchronize operations within the computer system. These clocking signals may be provided by a global clock generator or multiple clock generators, each dedicated to a portion of the computer system.

Of course, certain implementations and uses of the present invention may neither require nor include all of the above components. For example, in certain implementations, a keyboard or cursor control device for inputting information to the system may not be required. In other implementations, it may not be required to provide a display device for displaying information. Furthermore, the computer system may include additional processing units and/or buses.

Processor 103 of the present invention includes built-in power management capabilities to slow down the processor on external memory and I/O cycles. This reduces the active power consumption by the processor during these bus cycles. The processor 103 is slowed down by reducing or eliminating check transitions within processor 103. Whether clock transitions are reduced or stopped is dependent on the type of processor. In one embodiment, processor 103 is an Intel Architecture Microprocessor, such as the i486DX2™ SL Enhanced processor or a Pentium® processor manufactured by Intel Corporation of Santa Clara, Calif.

In one embodiment, the processor 103 (e.g., i486DX2™ SL Enhanced processor) of the present invention includes automatic clock control logic that slows the processor down to half speed on external memory and I/O read and write operations. That is, the number of internal core clocks are cut in half. This effectively reduces processor power consumption by 50 percent for these bus cycles. In another embodiment, processor 103 (e.g., Pentium® processor) includes the capability to stop the internal core clocks of the processor for external memory and I/O read operations and I/O write operations. From a CPU power consumption perspective, the external bus cycles appear to the processor to be "zero wait state" regardless of the actual time necessary to terminate (e.g., complete) the memory or I/O bus cycle.

External I/O and Memory Cycles

The processor of the present invention initiates bus cycles. The bus cycles are initiated in response to instructions that are executed by the processor or in response to system regulatory functions (e.g., cache line writeback). In one embodiment, a bus cycle is at least two clocks long and begins with an address status (ADS) output signal of the processor being asserted. The ADS signal indicates that a valid bus cycle definition and address are available on the bus cycle definition lines and the address bus respectively. The ADS signal and the address component indicates the start of the cycle. In one embodiment, the bus cycle definition lines include a memory/input-output (M/IO#), date/control (D/C#), and write/read (W/R#) lines. Other bus cycle definition lines may include LOCK# and PLOCK#, CACHE#, and/or SCYC. These signals are well-known in the art.

The manner in which a memory or I/O bus cycle is generated by a processor and completed within the computer system is well-known in the art and will not be described further, except where necessary to describe the teachings of the present invention.

A bus cycle includes a bus cycle completion signal (e.g., a ready signal) being asserted in the last clock. In one embodiment, the bus cycle completion signal comprises a ready signal, such as a RDY# or BRDY# signal. The RDY signal is an input that indicates that the current bus cycle is complete. The RDY signal indicates that the external system has presented valid data on the data pins in response to a read and that the external system has accepted the data from the processor in response to a write. In one embodiment, the RDY signal is ignored when the bus is idle (and at the end of the first clock of the bus cycle). The BRDY signal performs the same function during a burst cycle that the RDY performs during a non-burst cycle. The BRDY signal indicates that the external system has presented valid data in response to a read or that the external system has accepted data in response to a write. Therefore, the processor initiated memory and I/O cycles are terminated with a ready signal (e.g., RDY, BRDY, etc.).

While the bus cycle is being performed, the processor enters a reduced power consumption state. It is not until the processor receives the RDY (or BRDY) input signal that the processor returns to the fully powered state. In the present invention, the return of the RDY (or BRDY) signal is delayed for selected bus cycles. Because of the delay, the processor remains in the reduced power consumption state longer than the time the bus cycle requires to complete. By remaining in the reduced power consumption state, the overall power consumption of the computer system is reduced.

In the present invention, the ready signal is provided by a system controller. The system controller monitors the bus definition lines and the address lines to determine when a bus cycle to memory or I/O is occurring. This monitoring and recognition are implemented in the system control logic in a manner well-known in the art. When the bus cycle has been completed, the system controller returns the required ready signal to the processor to indicate the termination of the bus cycle. Thus, all bus transactions go through the system controller. In another embodiment, multiple system devices may be responsible for providing ready signals.

The system controller of the present invention includes circuit and control logic responsible for generating the ready signal. In the present invention, this logic performs finite power management by delaying the ready signal to save additional power for selected bus cycles. The additional power savings occurs because the processor remains in the reduced power consumption state longer than if the ready signal had been returned to the processor upon termination of the bus cycle. Importantly, because the processor is in a reduced power consumption state during execution of the instruction, the power savings occurs within an instruction boundary.

Note that bus cycles are generally deterministic, such that a standard system bus upon decoding the destination of a bus cycle (e.g., a hard disk or graphic or memory cycles to DRAM) requires only a finite time to access the device at the destination. The system logic in the system controller coordinates the access. By knowing the time necessary to complete a bus cycle, system logic can be configured/designed to delay the ready signal longer to save additional power for specific types of I/O or memory cycles. In one embodiment, these memory or I/O cycles with a delayed ready signal are those chosen by the system designer as not time critical or those that do not impact performance. In other words, these selected types of I/O and memory cycles are those with the latency of the response or termination of the activities not critical to the operation of the system. Thus, there is no performance impact or no user visible problems associated with delaying the RDY signal. Examples of such selected bus cycles include reads and writes to slow peripherals, such as reads or writes to a hard disk (e.g., to close a user session), or memory reads or writes to flash memory or EPROM.

Once the I/O cycles and memory cycles designated for having a delayed ready signal have been selected, the system controller monitors the bus cycles to determine if one of those selected bus cycles is occurring. The system logic monitors the address lines and the bus cycles definition lines of the processor. By decoding address lines and bus cycle definition lines and ascertaining those ranges of I/O or memory accesses associated with the selected bus cycles, the delay of the RDY signal can be implemented. In one embodiment the decoding or monitoring is performed by simple comparator logic or a set of range registers, the use of which are well-known in the art. Note that the delay of the ready signal can be controlled via registers or a software mechanism (e.g., a programmable ready delay). By writing to such registers, the ready delay times for specific bus cycles may be set.

Therefore, after the processor has launched a cycle, the system controller logic decodes the access to determine if the access is a memory cycle to dynamic random access memory (DRAM) or other destination or an I/O access either to I/O registers in the system controller or a device on the bus designated by the destination of the cycle. It is the responsibility of the system controller to terminate the cycles by returning the RDY signal (or BRDY signal) if the termination of bus cycles is deterministic. It is the responsibility of the agent receiving that bus cycle to terminate it in the case of a non-deterministic bus.

Figure 2:
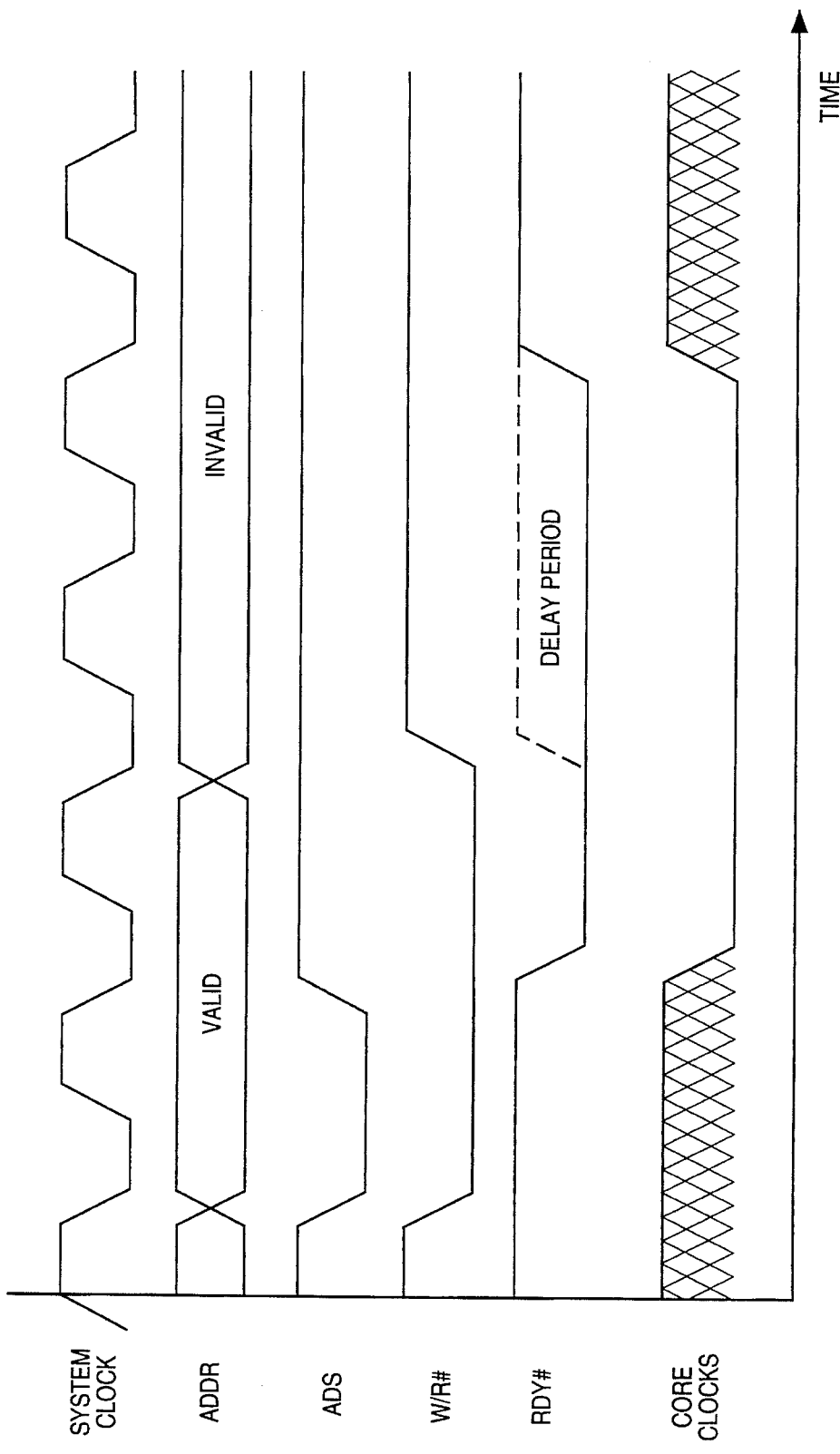
FIG. 2 is a timing diagram illustrating the present invention.

An example of a delayed ready signal is shown is FIG. 2 as a timing diagram. Referring to FIG. 2, a bus cycle is shown in which the assertion ready signal to complete the bus cycle has been delayed. The ADS and ADDR signals indicate the start of the bus cycle. The processor core clocks are shown being halted during the external bus cycle. The dotted line represents the timing of the RDY signal of no delay period was used (e.g., a prior art bus cycle).

The delay period associated with the selected I/O cycles may be either fixed, through hardwiring, or reprogrammable. The delay period may be implemented in part using a hardware or software timer. One of the selected bus cycles having a delayed ready signal may be directed to a dummy or unused port. The system can be programmed so that when such a port is read by the processor, the return of the ready signal is delayed to reduce the active power consumption. That is, logic may be included in the system which has a sole function to claim a cycle and delay the return of the ready signal. Therefore, every time a bus cycle is launched and destined for this logic, a delay to the return of ready would occur. Bus cycles to this logic could be performed repeatedly at fixed time intervals where, for instance, a delay timer loop runs and generates a bus cycle after a predetermined amount of time or after a predetermined number of instructions has occurred. In this manner, the computer system would be conserving power at regular intervals.

The port may be an unused region or memory location that is not physically present in the system. The port may also be an I/O location that would not be physically claimed by another device in the system. Because no device exists at the unused region or memory location that is physically not present in the system or an I/O location that physically would not be claimed by another device in the system, a delayed ready signal may be programmed to occur in response to bus cycles sent there. Thus, a read to the port delays the assertion of the ready signal for as long as the system designer has programmed its return.

Note that where an unused I/O port is used to reduce active power with a delayed ready signal, logic may be included to clear or reset the ready signal for the I/O port to allow critical events, such as interrupt processing, bus master requests or snoops, to be handled without delay. In one embodiment, external logic can reset the ready delay for programmable sources, such as interrupts, NMI, INTR, AHOLD, HOLD and BOFF signals, which are well-known in the art. In this manner, the port may be reset to return the ready signal prior to the expiration of its fixed delay length (e.g., prior to a timer timing out).

The present invention allows system designers to reduce active power consumption simply by setting an amount of time to hold back the processor bus cycle termination signal (e.g., RDY or BRDY) after a bus cycle, such as a memory or an I/O cycle, has been completed. The implementation of the external logic to delay the ready signal, and hence reduce or eliminate internal clock transitions, saves power. By combining the built-in capabilities of the processor with simple control of the bus cycle termination signal, the system designer can implement a low latency active power management technique because the I/O and memory cycles are not time activated. Also, active power consumption is reduced without adding excessive latencies because the same bus signals are used and the processor responds to these signals in the same manner as before, i.e. the processor powers up when receiving the bus cycle completion signal.

Exemplary Time Delays

The following are three exemplary scenarios where the present invention reduces power consumption due to reduced clocking during external cycles. For instance, in case of an I/O cycle (e.g., 8-bit) where the destination device or peripheral (e.g., timer controllers, DMA, interrupt controller, I/O mapped command registers, control registers, serial and parallel parts; floppy disk; keyboard, etc.) resides on a slower system bus (e.g., ISA bus) that runs at 8 MHz, the cycle time is 125 nanoseconds. This results in 1000 nanoseconds (8×125=1000) duration to complete the access to that device. The processor can terminate a cycle in two processor clocks. The processor of the present invention may run at speeds of, for instance, 33 to 66 MHz. In one embodiment, for a "zero-wait" state cycle and the processor operating at 50 MHz the time to terminate the cycle would be 50 nanoseconds. Therefore, the total time to complete the access less the cycle termination time is 950 nanoseconds (1000–50=950). Where each processor (CPU) clock comprises 25 nanoseconds, there are 38 processor clocks that occur during the remaining time of the I/O cycle. If processor clocks are stopped during this period of time, the processor can reduce power consumption attributed to generating the 38 processor clocks for I/O cycles to 8-bit ISA I/O.

On a memory access, such as with EPROM, which is not zero wait state and not shadowed into DRAM, wait states for EPROM accesses are on the order of 150–200 nanoseconds and these cycles are terminated on the ISA bus in 3–4 system clocks. A zero-wait state 16-bit memory access comprises three system clocks (e.g., 375 nanoseconds). Thus, the total amount of savings here is 325 nanoseconds (375–50=325). Therefore, there is an overall savings of 13 clocks (325/25= 13) for EPROM.

A DRAM memory access, which is typically zero unit state, and has a seven clock lead off, this leaving 5 clocks savings for the memory accesses.

Therefore, as described above, the following exemplary savings may be achieved by the built-in power management capabilities of one embodiment of the processor of the present invention:

13 clocks for EPROM
38 clocks for I/O
5 clocks for DRAM

In each of these cycles, additional clock savings can be achieved when the assertion of cycle termination indication signal to signal the end of a bus cycle is delayed. Such delays may be any number of system clocks (e.g., 1, (125 nanoseconds) 2, 3, . . . , etc.), or processor clock cycles, and could be in the tens or hundreds of the numbers of processor clocks being saved.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for reducing power consumption in a computer system using ready delays has been described.

I claim:

1. A computer system comprising:

a bus;

a memory coupled to the bus to store data and instructions;

a processor coupled to the bus for executing said instructions, wherein the processor performs bus cycles on the bus in response to executing said instructions, and further wherein the processor enters a reduced power consumption state while at least one bus cycle is being performed and exits the reduced power consumption state upon completion of said at least one bus cycle; and a controller coupled to the bus to monitor bus cycles from the processor, wherein the controller indicates completion of bus cycles to the processor using a completion indication coupled to the processor, wherein the controller withholds the completion indication for a period of time after completion of said at least one bus cycle to control power consumption by the processor, such that power consumption in the processor is reduced within an instruction boundary.

2. The computer system defined in claim 1 wherein the completion indication places the processor in the ready state.

3. The computer system defined in claim 1 wherein the completion indication comprises a READY signal.

4. The computer system defined in claim 1 wherein said at least one bus cycle is destined for an unassigned location.

5. The computer system defined in claim 4 wherein the a portion of the controller is programmed to withhold the completion indication for the period of time after completion of said at least one bus cycle.

6. The computer system defined in claim 4 wherein a portion of the controller is hardwired to withhold the completion indication for the period of time after completion of said at least one bus cycle.

7. A computer system comprising:

a bus;

a memory coupled to the bus to store data and instructions;

a processor coupled to the bus for executing said instructions, wherein the processor performs bus cycles on the bus in response to executing said instructions, and further wherein the processor enters a reduced power consumption state while at least one bus cycle to an address is being performed and exits the reduced power consumption state upon completion of said at least one bus cycle; and a control logic coupled to the bus to monitor bus cycles from the processor, wherein the control logic provides a completion indication to the processor indicating completion of each bus cycle, wherein the control logic withholds the completion indication for a period of time after completion of said at least one bus cycle to control power consumption by the processor, such that power consumption in the processor is controlled within an instruction boundary.

8. The computer system defined in claim 7 wherein the address comprises a memory address.

9. The computer system defined in claim 7 wherein the address comprises an input/output (I/O) address.

10. The computer system defined in claim 7 wherein the completion indication places the processor in the ready state.

11. The computer system defined in claim 7 wherein the completion indication comprises a READY signal.

12. The computer system defined in claim 7 wherein said at least one bus cycle is destined for an unassigned location.

13. The computer system defined in claim 10 wherein the a portion of the controller is programmed to withhold the completion indication for the period of time after completion of said at least one bus cycle.

14. The computer system defined in claim 10 wherein a portion of the controller is hardwired to withhold the completion indication for the period of time after completion of said at least one bus cycle.

15. A computer system comprising:

a bus;

a memory coupled to the bus to store data and instructions;

a processor coupled to the bus for executing said instructions, wherein the processor performs bus cycles on the bus, and further wherein the processor generates a read cycle on the bus to a location external to the processor, and further wherein the processor enters a reduced power consumption state during said read cycle and exits the reduced power consumption state upon completion of said read cycle; and a system logic coupled to the bus to monitor bus cycles from the processor, wherein the system logic indicates completion of bus cycles to the processor using a completion indication coupled to the processor, wherein the system logic withholds the completion indication for a period of time after completion of said read cycle to control power consumption by the processor, such that power consumption in the processor is controlled.

16. The computer system defined in claim 15 further comprising logic coupled to the system logic to cause the system logic to provide the completion indication prior to expiration of the period of time.

17. The computer system defined in claim 16 wherein the logic causes the system logic to provide the completion indication in response to an interrupt.

18. The computer system defined in claim 16 wherein the logic causes the system logic to provide the completion indication in response to a bus master request.

19. The computer system defined in claim 16 wherein the logic causes the system logic to provide the completion indication in response to a cache memory snoop operation.

20. The computer system defined in claim 16 wherein the logic causes the system logic to provide the completion indication in response to a programmed source.

21. A method for reducing power consumption by a processor in a computer system having a bus, wherein the processor enters a reduced power consumption state during bus cycles initiated by the processor on the bus, said method comprising the steps of:

generating a bus cycle, such that the processor enters the reduced power consumption state; and maintaining a completion signal for indicating completion of the bus cycle to the processor as non-asserted for a period of time after completion of said bus cycle, wherein the processor remains in the reduced power consumption state after the bus cycle has completed, such that power consumption in the processor is controlled within an instruction boundary.

* * * * *